(12) United States Patent
McDermott

(10) Patent No.: US 7,479,344 B1
(45) Date of Patent: Jan. 20, 2009

(54) CONFORMABLE BATTERY

(76) Inventor: Patrick P. McDermott, 2411 Rocky Branch Rd., Vienna, VA (US) 22181

( * ) Notice: Subject to any disclaimer, the term of this patent is extended or adjusted under 35 U.S.C. 154(b) by 219 days.

(21) Appl. No.: 11/455,186

(22) Filed: Jun. 19, 2006

(51) Int. Cl.
*H01M 6/00* (2006.01)

(52) U.S. Cl. .................. 429/127; 429/110; 429/115; 429/116

(58) Field of Classification Search .............. 429/127, 429/110, 115, 116
See application file for complete search history.

(56) References Cited

U.S. PATENT DOCUMENTS

| 6,187,471 B1 | 2/2001 | McDermott et al. | 429/110 |
| 6,248,472 B1 | 6/2001 | Kelemen | 429/163 |

FOREIGN PATENT DOCUMENTS

WO    WO 0131729    3/2001

*Primary Examiner*—Jane Rhee
(74) *Attorney, Agent, or Firm*—Cantor Colburn LLP

(57) ABSTRACT

A conformable battery wherein the outer casing has an upper face plate, a lower face plate, and at least one perimetric wall, and an interior of the battery comprising a grid of walls extending from the upper face plate to the lower face plate and connecting to the at least one perimetric wall, thereby dividing the interior of the battery into at least two compartments and increasing the battery's structural stiffness and ability to sustain increased internal pressure. Each compartment contains an electrochemically active plate stack, and a network of electrical conductors provides electrical connection between the plate stacks in each of the compartment. The battery may further comprise a reservoir containing an acid additive which, when released into each of the compartments, shifts the battery from a low power mode into a high power mode.

19 Claims, 11 Drawing Sheets

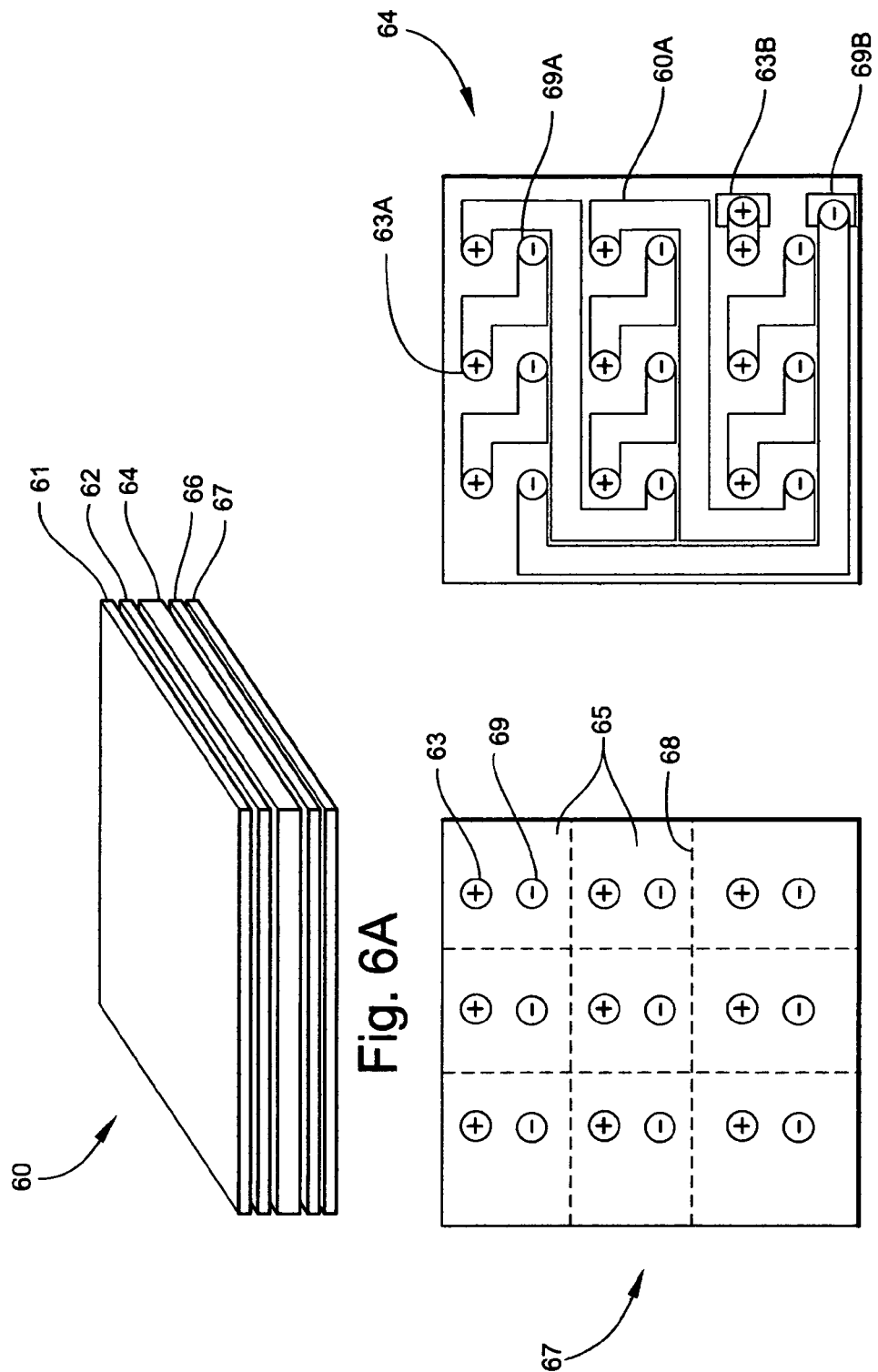

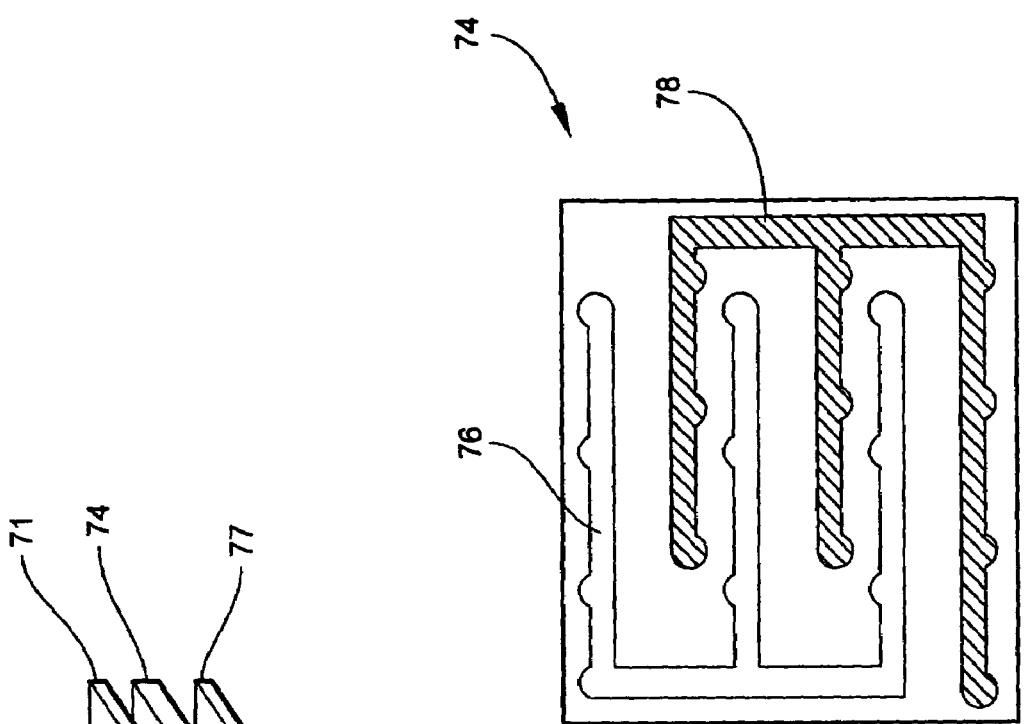
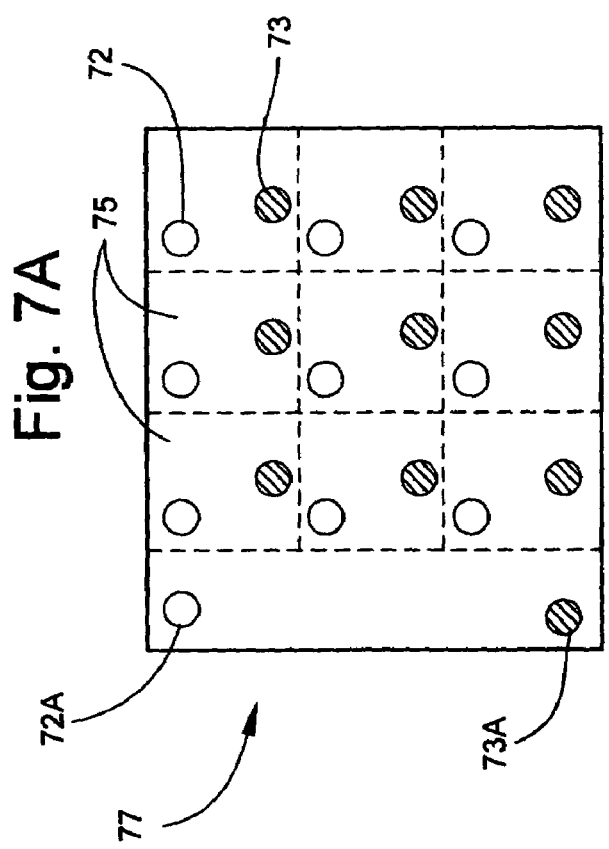
Fig. 7A
Fig. 7B
Fig. 7C

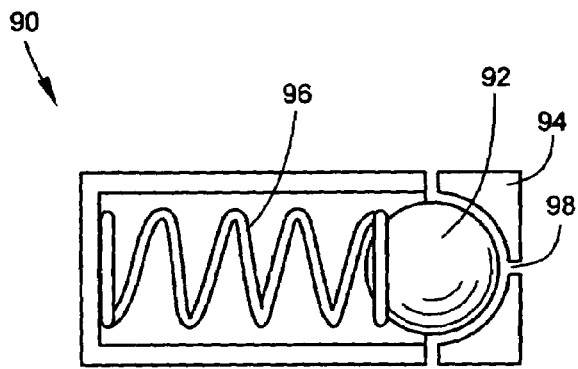
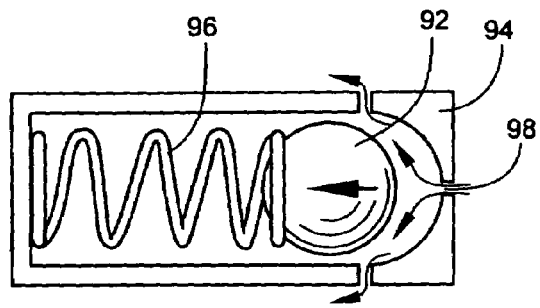
Fig. 9A    Fig. 9B
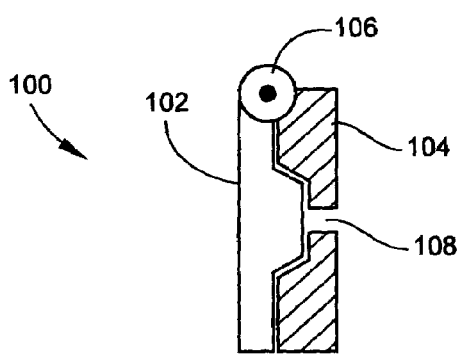
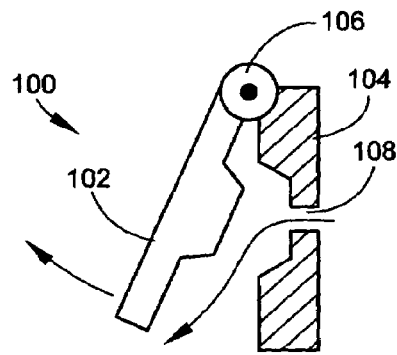
Fig. 10A    Fig. 10B
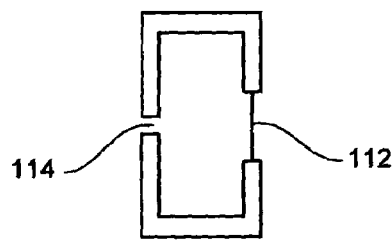
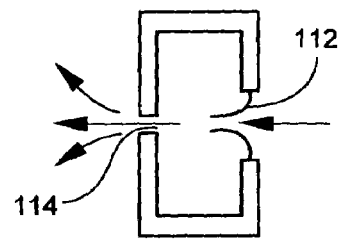
Fig. 11A    Fig. 11B

CONFORMABLE BATTERY

This application is related to U.S. patent application Ser. No. 10/456,625, filed on Jun. 9, 2003, which claims priority of U.S. Provisional Application No. 60/386,167, filed on Jun. 7, 2002. Elements of the Conformable Battery concept incorporate activation means described in the Bimodal Battery of U.S. Pat. No. 6,187,471, issued to the current inventor on Feb. 13, 2001, and are included herein by reference.

BACKGROUND OF THE INVENTION

1. Field of the Invention

The present invention relates to batteries. More particularly, the invention comprises a battery which can be manufactured in a variety of shapes and geometries that can better utilize available space in specific applications.

2. Description of the Prior Art

Most high power, high energy density batteries used in the aerospace, defense, electric vehicle and other industries today consist of cylindrical or rectilinear, prismatic-shaped cells used singly, or connected in parallel or series into battery packs, depending on the voltage and current requirements of the mission. These batteries are classified as either primary or secondary depending on the intended use and design of the battery.

In a primary battery, the stored energy is released in an irreversible process, and the battery is depleted when the total energy of the cell is released. A secondary battery is one where the stored energy is released in a reversible process, and the battery is capable of being repeatedly charged and discharged.

Examples of secondary batteries include lead acid, nickel cadmium, and nickel metal hydride batteries, which have found widespread use in the commercial market place as rechargeable electrical power sources for use in tools, starting motors, flash lights, electric vehicles, and a variety of other uses. Aerospace qualified nickel cadmium and nickel hydrogen batteries are used in space and satellite applications to provide renewable sources of electrical energy, recharged with solar panels extended from the satellite structure. Secondary lithium ion batteries are now being introduced as high energy density power sources for both space and electric vehicle applications.

In most of the above examples, the battery consists of multiple cylindrical or prismatic cells built up by connecting these cells into cell packs, usually a rectilinear package similar in form to a standard automobile battery. In the case of the nickel hydrogen batteries, called common vessel batteries, in addition to the electrical connection between cells, there is also a network of tubing that allows pressurized hydrogen to flow from cell to cell. Primary batteries also utilize cylindrical and prismatic cells connected in series or parallel, depending on the voltage and current needs of the application.

A reserve battery is a primary battery that can be stored for long periods of time prior to discharge, requiring some form of activation to bring it to a full operational state. The reserve battery is inhibited from open circuit self-discharge during the pre-activation state by having the electrolyte stored separately from the electrodes or by having the electrolyte infused into the plate stack of the battery in a non-conductive state.

Aerospace and defense applications usually employ a so-called "thermal" battery as a reserve battery. For the thermal battery, the electrolyte permeates the plate stack as a solid state salt and is non-conductive for the range of storage temperatures in the pre-activation state. The thermal battery is activated by the ignition of an internal pyrotechnic that heats the electrolyte salt to a liquid state, wherein the electrolyte is capable of conducting current, thereby activating the battery.

In other reserve battery designs, the plate stack is dry and the electrolyte is stored in liquid form in a separate storage reservoir. Upon activation, the electrolyte is injected into the plate stack, allowing the battery to discharge current into the load attached to the terminals of the battery. In the lithium thionyl chloride reserve battery, for example, an acidic form of the thionyl chloride electrolyte is contained in the separate reservoir and injected into the plate stack to achieve activation.

The bimodal battery (U.S. Pat. No. 6,187,471) is an alternative design of the reserve lithium battery which allows it to function as a low-drain battery during periods of storage, and then, after activation, to function as a very high current battery to meet high power density missions. In the bimodal battery, the plate stack is infused with non-acidic, neutral thionyl chloride based electrolyte which allows it to function as a low-current drain power source. Activation is achieved by injecting and mixing an acid additive that creates an acidic form of the electrolyte in the plate stack. The acid electrolyte allows the battery to function as a very high current power source for a relatively short period of time.

Both thermal and thionyl-chloride reserve batteries are used in aerospace and defense applications to power missile and launch vehicle electronics, ignition of pyrotechnics for staging and separation, electric actuators for moving fins and control surfaces, and passive and active on-board sensors. These applications require heavy current for a limited duration of time.

Secondary batteries are used, once a satellite has been launched into space, to continuously power the electronics, the telecommunication data links and sensors. These batteries can be recycled in space for multi-year missions using large solar arrays to recharge the batteries.

Many of the high energy density, high power density batteries used for aerospace and defense create high levels of thermal energy and internal pressure during their operation. These effects are taken into account when designing batteries, such as thermal management techniques to remove heat from the core of the battery, and special pressure containment vessels and relief valves to manage internal pressure buildup. As a result of these thermal and pressure requirements, system designers are often constrained by the form and fit factors of the batteries designed for aerospace applications.

Thin flat-plate and conformable batteries have been developed in the commercial electronics industry to maximize packaging density, allowing system designers to efficiently add the battery to the electronics system without having to design the electronics package around the shape of the battery. Cell phones, for example, have snap-on batteries with relatively thin rectilinear shapes. Thin-line button cells are used in watches to conform to the shape of the watch. These batteries, however are not required to deliver the high currents required in the aerospace applications cited heretofore. What is needed in the aerospace and defense industry are battery concepts that give the aerospace engineer or missile designer the same design flexibility, to efficiently fit the battery into the electronics environment without having to distort that environment.

SUMMARY OF THE INVENTION

The intent of the conformable battery concept of the present invention is to bring the design flexibility already exploited in low-drain batteries of commercial electronics to the high energy and power density batteries of missile and aerospace electronics. Electronics are usually laid out on printed wire circuit boards (PWBs) or cards, which are planar, rectangular-shaped plates, sometimes stacked in parallel into electronics boxes to conserve space. Conformable batteries built in the same shape can be slid into the electronics box enclosure along with the printed circuit cards. Missile bodies are cylindrical in shape with electronics on disks that are stacked in parallel in a cylindrical electronics box. Thin-walled conformable batteries could also be built in a curved shape that fits around the electronics and conform to the outer shape of the missile.

Space satellites are sometimes built in modular fashion as rectangular or cylindrical boxes with components and subsystems stacked on shelves within the enclosure. Conformable batteries powering the satellite could be built as a flat plate that can act as one or more of the shelves. In this concept, the battery would be acting as a multi-functional element of the system. It would serve as a power source, but also as a structural member of the satellite structure.

In the Conformable Battery concept of the invention, the battery casing is formed by sandwiching a grid of short vertical walls between top and bottom plates, thus forming individual compartments, mechanically and electrically isolated from each other. The walls of these compartments act as stiffeners between the two outer casing plates providing substantial mechanical strength and stiffness, similar to light-weight aluminum or composite aerospace structures made from honeycomb structures sandwiched between two face sheets. The multi-compartments can serve as enclosures for individual cell plate stacks which can then be linked together electrically with series or parallel connections.

Depending on how the individual compartments are shaped, the architecture of the Conformable Battery allows for distribution of individual cell plate stacks across different geometries including: rectangular or cylindrical flat plate batteries, curved plate batteries, cylindrical batteries with an open core, or other three dimensional shapes that conform to the geometric requirements of specific applications.

In addition to enabling the batteries to be used as structural elements of missiles and satellites, the thin plate geometries have the added value of increasing the surface area of the external packaging, thereby facilitating better transfer of heat from the plate stacks to the external environment. This is especially important in the case of high rate of discharge batteries, where the heat of the electrochemical reactions occurring during discharge can be trapped in the core of cylindrical or prismatic geometries, increasing internal pressures and degrading performance.

The internal structure of stiffeners also contributes to the ability of the casing to contain substantial internal gas pressures that can be generated during charge/discharge cycles, especially in the case of nickel-hydrogen batteries, by distributing and channeling the mechanical load on the large area face plates through the grid of vertical compartment walls.

The Conformable Battery concept and architecture is applicable to a number of secondary and primary battery chemistries. In the case of secondary batteries, this includes, but is not limited to: lead acid, nickel cadmium and nickel metal hydride batteries, which have found widespread use in the commercial market place as rechargeable electrical power sources, and aerospace qualified nickel cadmium and nickel hydrogen batteries used in space and satellite applications, and secondary lithium ion and batteries for use in space applications, as well as, terrestrial electrical vehicle applications.

The Conformable Battery concept and architecture is also applicable to the field of primary batteries, including, but not limited to, common alkaline primaries, lithium ion, and low-drain lithium oxyhalide (e.g. lithium thionyl chloride). As regards the conventional primary reserve batteries, the Conformable Battery concept, although feasible, might be impractical for certain classes of the primary reserve batteries, for example, the high temperature reserve thermal batteries (too much heat radiated away from the battery during operation), or the reserve lithium thionyl chloride battery with the separate acid electrolyte reservoir (difficult to maintain a vacuum in the multi-compartment flat plate architecture, then pump large quantities of electrolyte throughout the individual compartments). In conventional lithium reserve batteries, the electrolyte must be forcibly injected in the plate stack under relatively high pressure in order to assure rapid contact of the electrolyte with the dry plate stack.

Limitations associated with the Conformable Battery architecture for primary reserve batteries, however, do not extend to the Bimodal Battery concept. In fact, the Bimodal Battery is an excellent candidate for use as a Conformable Battery. In the case of the Bimodal Battery, where most of the neutral electrolyte is already stored in the multiple compartments, only the acid additive need be injected into the compartments during activation, and the activation process can be carried out under moderately low pressures. This low pressure, moderate temperature environment is why the Bimodal Battery is an excellent candidate for implementing the Conformable Battery concept, as opposed to the conventional thermal or lithium thionyl chloride reserve battery with separate reservoir.

The Bimodal Battery is potentially 30-40% smaller in size than conventional primary reserve lithium batteries since the acid component held in reserve prior to activation is much smaller, volumetrically, than the total electrolyte held in reserve in the conventional lithium reserve battery. The bimodal battery is also potentially lighter in weight, since the mechanisms required to pump and mix the additive are smaller and operate at a much lower pressure. This more benign, lower pressure activation reduces the need for high pressure, heavy containment vessels, and could also provide more margin of safety since the activation is less stressful. In the Bimodal Battery, the lower pressure of activation allows some flexibility in the types of geometries that can be accommodated.

In order to improve the manufacturability of the Conformable Battery, much of the wiring to connect the multiple compartments, as well as the fluidic paths required to move electrolyte additives into the multiple compartments, can be embedded in the top and bottom plates enclosing the battery casing.

The present invention provides a battery architecture wherein the outer casing of the battery may be configured in a variety of shapes to fit specific applications including flat planar designs (circular, square, rectangular) and three-dimensional geometric shapes (e.g. curved plates, thin cylinders with hollow cores, other geometric shapes).

Accordingly, it is a principal object of the invention to provide an internal structure to a battery, forming multiple compartments where the walls of the compartments are bonded to the outer skin, contributing to the batteries' structural stiffness, integrity, and ability to sustain moderate to high internal pressure.

It is another object of the invention to provide a battery that can be configured in different external shapes, by selective arrangement of individual plate stacks in separate, electrically isolated compartments, contiguous to each other, depending on the desired geometry, with each compartment containing an isolated electrochemically active plate stack.

It is a further object of the invention to provide a battery that can provide higher voltages through series connection of multiple plate stacks, and/or multiple voltages through voltage taps at various locations throughout the multi-compartment plate stack compartments.

Still another object of the invention is to provide a battery where plate stack cells are distributed over flat rectangular or circular shaped flat plates, curved plates, or other three dimensional shapes, depending on the requirement of the application, creating a large surface area in the external casing in order to enhance heat dissipation.

It is an object of the invention to provide an architecture for the reserve lithium Bimodal Battery with the attributes of the Conformable Battery, including a relatively large external surface area to facilitate heat transfer from the core of the battery to the external environment, a multi-compartment architecture to allow for higher voltages through series connections, as well as the ability to provide for multiple voltage taps.

It is an object of the invention, in the case of the Bimodal Battery, to provide a manifold system with tubing or channels to distribute the acid additive from a central dispensing reservoir to each of the plate stack compartments in a multi-compartment battery.

It is an object of the invention, in the case of the Bimodal Battery, to provide a return manifold system, when needed, to move excess electrolyte into an electrolyte collection reservoir, as the acid additive is pumped into each compartment of the multi-compartment battery.

It is an object of the invention in the Bimodal Battery, to provide an alternate means of handling excess electrolyte in each of the multi-compartments by creating "dimples" in the outer casing at each compartment (concave curvature) which are then popped out to a planar or convex curvature when the acid additive, under pressure, is added to each compartment, increasing the liquid volume in each compartment. This eliminates the need for a separate return manifold system for the Bimodal Battery.

It is an object of the invention to provide a means of introducing acid additive into each compartment of the Bimodal Battery without recourse to a separate return manifold by partially filling each compartment with neutral electrolyte thus leaving a void within the compartment for additional electrolyte.

It is an object of this invention to provide alternative means of electrically connecting the plate stacks within the multiple compartments by means of a multi-layer composite structure within the battery case consisting of electrical grids, insulating layers and interlayer connecting vias to provide series and/or parallel electrical connections between compartments.

It is an object of this invention to provide alternative means of inter-compartment fluidic connection (liquid or gaseous phase) to move electrolyte and additives, or gaseous products, in and out of the compartments by means of layered structures integral to the outer casing using what is known in the aerospace industry as "platelet" technology. In platelet technology, channels and vias are cut out of thin metal plates using conventional metal stamping or laser cutting techniques, then superimposed, stacked up, and then soldered, brazed or diffusion bonded in such a manner that closed channels are formed, allowing fluids to circulate between compartments.

It is the object of the invention to prevent "soft shorts" (that is, parasitic currents between compartments at different voltage levels) before and after activation of the Bimodal Battery, through a variety of means, including pressure sensitive one-way valves between the central well and the compartments, frangible membranes, or pressure sensitive plugs between the central well and compartments, and, after activation, means for retarding the flow of electrolyte between compartments by lengthening the electrolytic path between compartments or placing pin-hole orifices in the path to restrict flow.

It is the object of the invention to prevent parasitic currents before and after activation by placing acid additive in frangible glass or ceramic ampoules within the volume of the plate stack itself, enclosing both within a sealed metallic foil pouch.

It is an object of this invention to provide a means of fracturing the ampoules and allowing the acid to mix with the acid electrolyte by detonating a small pyrotechnic charge in the central well or elsewhere in the battery, creating a shock wave which propagates through the battery, shattering the ampoules.

It is the object of this invention to provide a mechanical means of fracturing the ampoules by providing a series of mechanical "tampers", one for each ampoule, which transfers the energy from the pyrotechnic charge in the central well directly into the ampoule, fracturing it and allowing the acid additive to mix with neutral electrolyte.

It is an object of the invention to provide improved elements and arrangements thereof in an apparatus for the purposes described which is inexpensive, dependable and fully effective in accomplishing its intended purposes.

These and other objects of the present invention will become readily apparent upon further review of the following specification and drawings.

BRIEF DESCRIPTION OF THE DRAWINGS

Various other objects, features, and attendant advantages of the present invention will become more fully appreciated as the same becomes better understood when considered in conjunction with the accompanying drawings, in which like reference characters designate the same or similar parts throughout the several views, and wherein:

FIG. 6A is an exploded side perspective view of a five (5) layered, composite structure serving as the outer casing as well as providing a series electrical connection grid for the bimodal battery of FIG. 1A.

FIG. 6B is a top view of the interior layer of the five (5) layer outer casing composite structure of FIG. 6A.

FIG. 6C is a top view of the mid layer of the five (5) layer outer casing composite structure of FIG. 6A.

FIG. 7A is an exploded side perspective view of a three (3) layer outer casing composite structure providing fluid channels to the nine compartment bimodal battery of FIG. 4.

FIG. 7B is a top view of the interior layer of the three (3) layer outer casing composite structure of FIG. 7A.

FIG. 7C is a top view of the mid layer of the three (3) layer outer casing composite structure of FIG. 7A.

FIG. 9A is a side view of a one-way pressure sensitive ball valve between the central well and one compartment before activation.

FIG. 9B is a side view of a one-way pressure sensitive ball valve between the central well and one compartment after activation.

FIG. 10A is a side view of a spring-loaded one-way pressure sensitive flapper valve between the central well and one compartment before activation.

FIG. 10B is a side view of a spring-loaded one-way pressure sensitive flapper valve between the central well and one compartment after activation.

FIG. 11A is a side view of a pressure sensitive frangible membrane with a pin-hole orifice between the central well and one compartment before activation.

FIG. 11B is a side view of a pressure sensitive frangible membrane with a pin-hole orifice between the central well and one compartment after activation.

DETAILED DESCRIPTION OF THE PREFERRED EMBODIMENTS

FIGS. 1A through 3 depict the basic structure of the conformable battery architecture.

Figure 1A:
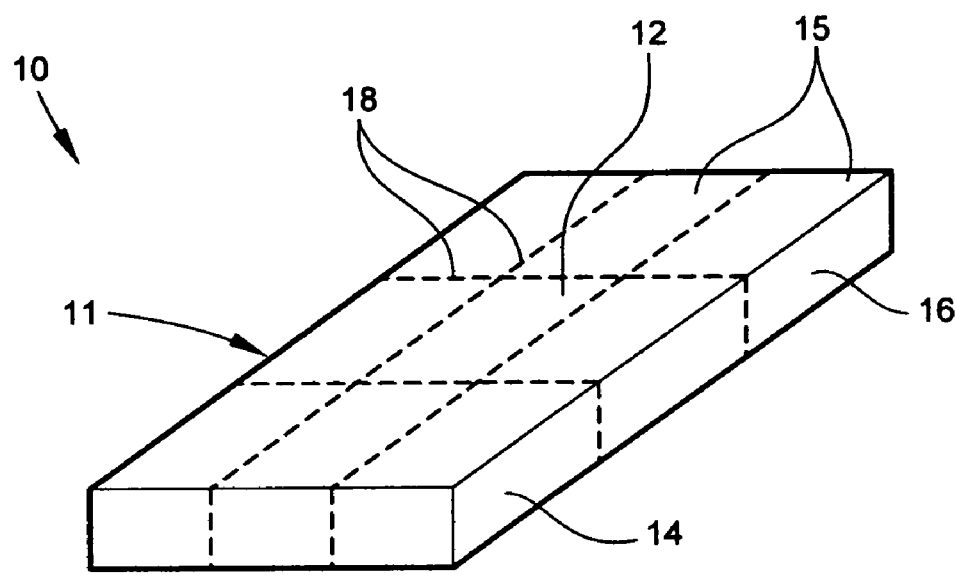
FIG. 1A is a perspective view of the outer casing of a nine compartment, rectangular-shaped conformable battery.
Figure 1B:
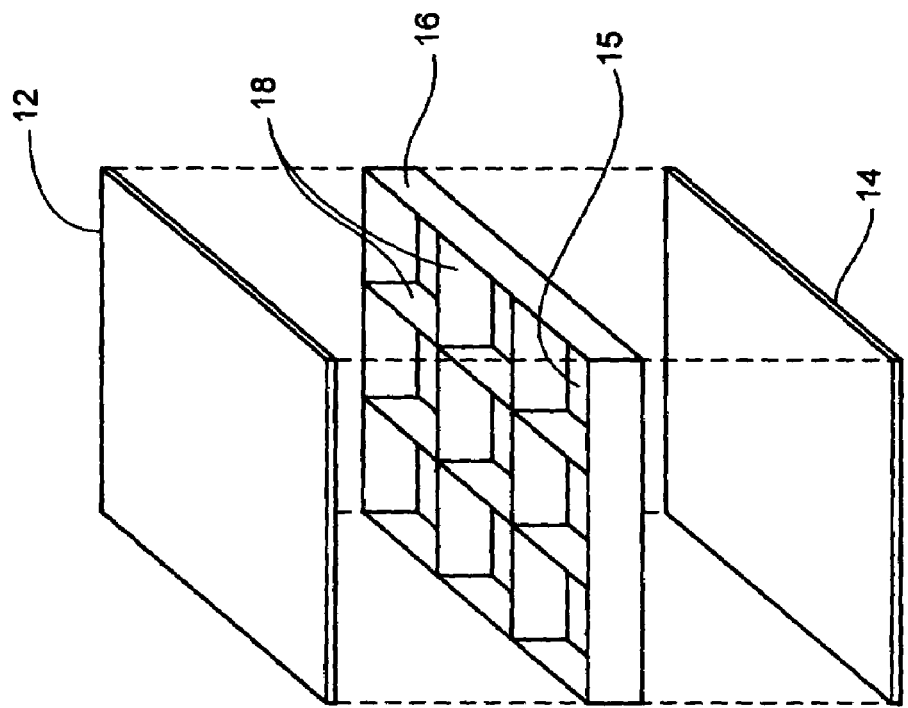
FIG. 1B is an exploded view of a nine compartment, rectangular-shaped battery of FIG. 1A, showing the grid of compartment walls with top and bottom outer casing plates.

A thin walled, flat-plate, substantially rectangular battery 10 is depicted at FIGS. 1A and 1B. The battery 10 has an outer casing 11 consisting of a casing top 12, a casing bottom 14, and casing side walls 16.

Figure 2A:
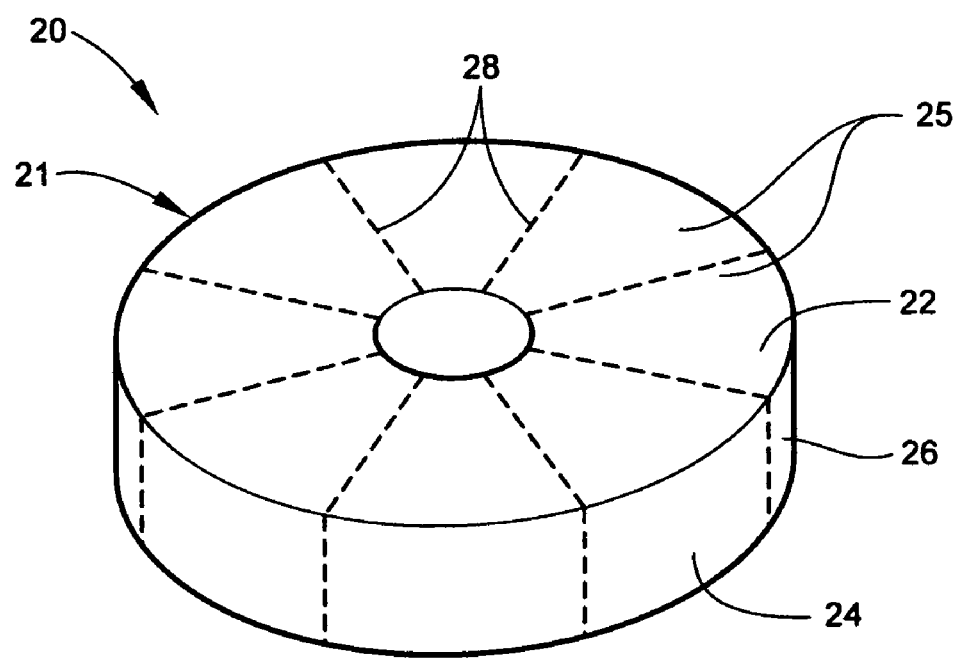
FIG. 2A is a perspective view of the outer casing of an eight compartment, circular-shaped conformable battery.
Figure 2B:
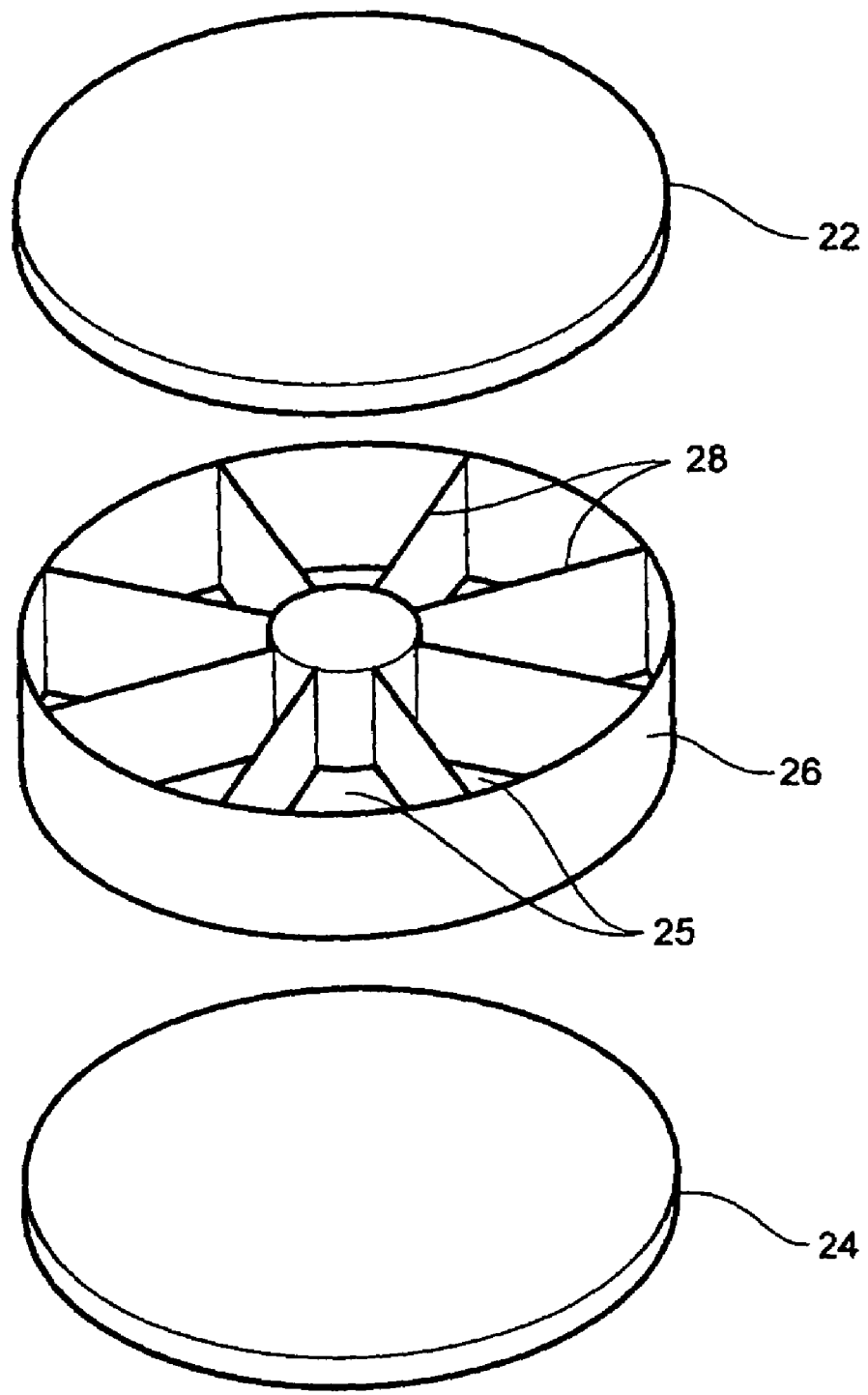
FIG. 2B is an exploded view of a circular battery of FIG. 2A, showing the grid of pie-shaped compartment walls with top and bottom outer casing plates.

A thin walled, flat-plate, circular battery 20 is depicted at FIGS. 2A and 2B. The battery 20, again, has an outer casing 21 consisting of a casing top 22, a casing bottom 24, and a casing circumferential wall 26.

Figure 3:
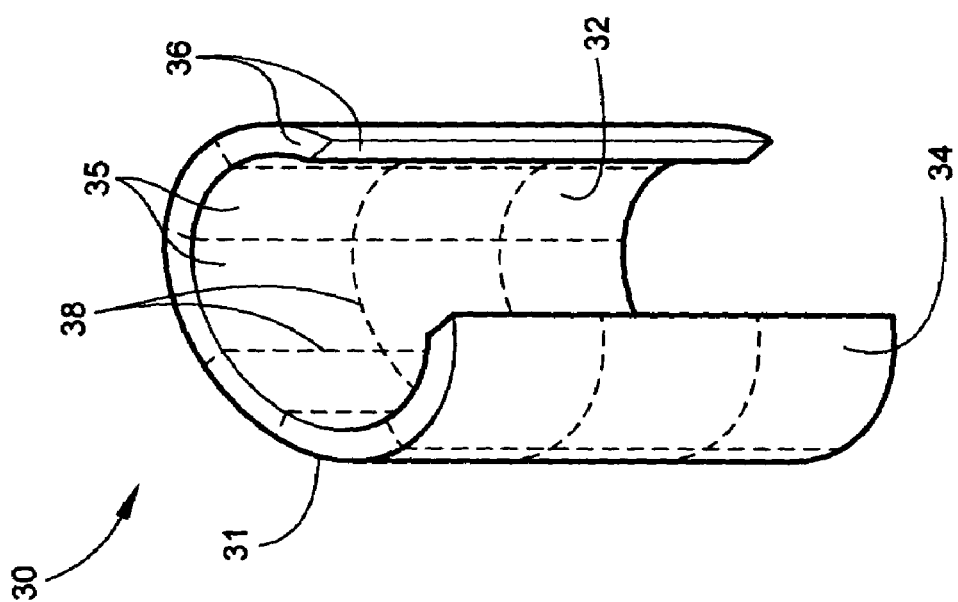
FIG. 3 is a perspective view of the outer casing of an eighteen compartment conformable battery in the form of a truncated cylinder with an open core.

A truncated, semi-cylindrical battery 30 is depicted at FIG. 3. The battery 30 has a casing 31 consisting of an inner casing wall 32, an outer casing wall 34, and casing side walls 36. The semi-cylindrical battery 30 of FIG. 3 is similar to the rectangular battery 10 of FIGS. 1A and 1B, with the plates curved to form the semi-cylindrical shape. (Hereinafter, with the exception of shape, the descriptions of the structure of the flat-plate battery 10 will apply equally to the semi-cylindrical battery 30.)

These basic configurations illustrate the advantages of the conformable battery concept where various geometries can be produced to better meet the requirements of specific applications from a form, fit and function point of view.

The flat plate or conformal configuration facilitates compartmentalization of individual plate stacks for multi-compartment architectures, allowing multiple voltage taps, or higher voltage operation with series connection of multiple compartments. The dotted lines 18/28/38 in FIGS. 1A, 2A, and 3 illustrate how these flat-plate/conformal designs can be compartmentalized, with compartment walls bonded to the outer skin of the battery contributing to structural stiffness and integrity. Each compartment in subsequent Figures will be shown to contain the electrochemically active plate stacks (positive and negative electrodes, with separators, immersed in neutral electrolyte).

Interior walls 18/28/38 are bonded to the interior surfaces of the outer casings 11/21/31, forming individual compartments 18/28/38 within the batteries 10/20/30, each compartment 15/25/35 isolated from each of the other compartments 15/25/35. Within each compartment 15/25/35, is an electrochemically active plate stack (not shown)(positive and negative electrodes, with separators, immersed in neutral electrolyte, as known in the art). In addition to isolating the compartments 15/25/35 from one another, the bonding of the interior walls 18/28/38 to the interior surfaces of the outer casings 11/21/31 contributes to the structural stiffness and integrity of the outer casing 11/21/31.

Figure 4:
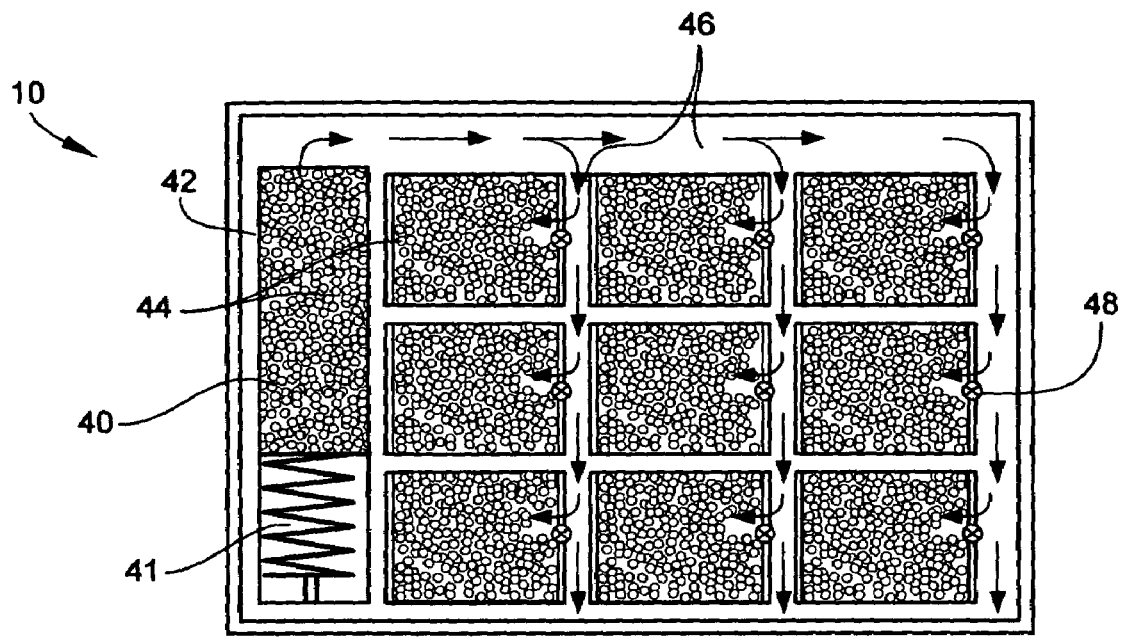
FIG. 4 is a top view of the bimodal form of a rectangular battery with electrolyte additive injected into the compartments from a side well.

At FIG. 4, the rectilinear battery 10 of FIGS. 1A and 1B is shown in further detail. An acid reservoir 40 is located at one end of the battery 10 and separated from each of the compartments 15 by a perimetric wall 42. An acid additive 44 is contained within acid reservoir 40. Acid additive 44 is dispensed via a spring-loaded piston activation mechanism 41 from the acid reservoir 40 into each of the compartments 15 through a network of tubes 46 connecting acid reservoir 40 and the various compartments 15. Each compartment 15 is isolated from the tubes 46 by a valve 48 (shown generically in FIG. 4, to be further described hereinafter) which is designed to inhibit "soft shorts", or the ionic species from one compartment migrating from one compartment to others, which may be at a higher voltage level in a series connected battery.

It would be evident to one skilled in the art that while most batteries are of a rectilinear shape, other polygonal or free form shapes are equally feasible. Herein after, the term rectangular or rectilinear may also be interpreted as applying to other polygonal or free form shapes.

Figure 5:
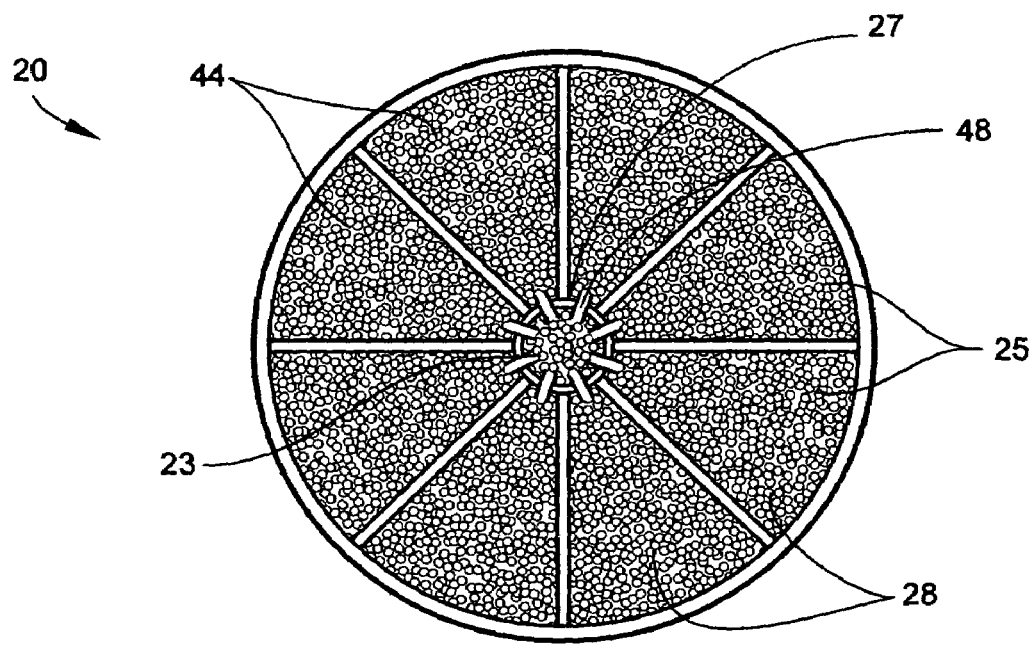
FIG. 5 is a top view of the bimodal form of a circular battery with electrolyte additive injected into pie-shaped compartments from a central well.

At FIG. 5, the circular battery 20 of FIGS. 2A and 2B is shown in further detail. A central well 23 is located at the center of circular battery 20, enclosed by a circumferential wall 27, separating the central well 23 from each of the compartments 25. An acid additive 44 is contained within central well 23. Acid additive 44 is dispensed from the central well 23 into each of the compartments 25 through a valve 48 (shown generically in FIG. 5, to be further described hereinafter) passing through circumferential wall 27 into each of the compartments 25. Each valve 48 is designed to inhibit "soft shorts", or the ionic species from one compartment migrating from one compartment to others which may be at a higher voltage level in a series connected battery.

It would be evident to one skilled in the art that while a circular battery has been described, oval or free form shapes are equally feasible. Herein after, the term circular may also be interpreted as applying to other substantially rounded or free form shapes.

FIGS. 6A through 6C show an alternate means of electrically connecting plate stacks in the various compartments in series and/or parallel connections via a multi-layer composite structure in the upper (and/or lower) outer casing of the battery. FIGS. 7A trough 7C show an alternative means of pumping fluids, including the acid additive, into each of the compartments, and retrieving excess electrolyte when required. As in FIGS. 6A through 6C, the means for accomplishing this is via a multilayered composite structure in the upper (and/or lower) outer casing of the battery.

The alternative electrical and fluidic multilayer composite structures are proposed to assist the manufacture and assembly of the battery, since the composite outer casing structures can be easily manufactured on a production line, and reduce the amount of touch labor required in final battery assembly.

FIGS. 6A through 6C illustrate a five (5) layer system for electrically interconnecting the compartments 65 in a series connection format, with the five (5) layer system forming one wall 60 of the outer casing of the battery. The multilayer structure is described as follows. Layers 61 and 67 constitute the outer and inner layers of the composite casing structure, with insulating layers 62 and 66 protecting the electrical grid, shown as layer 64. Both the insulating layer 66 and bottom layer 67 have vias 63 (positive) and 69 (negative) as depicted in FIG. 6B, allowing the plate stacks in compartment 65, separated by interior walls 68 to be electrically connected (soldered) to the grid 64 during battery assembly.

At FIG. 6C, the mid layer 64 contains a network of ribbon conductors 60A connecting, in series, the positive tab 63A of one plate stack in compartment 65 with the negative tab 69A of the same plate stack. Each of the plate stacks in the various compartments 65 are thus connected in series, such that the voltages are additive. The ribbon connectors 60A are typically formed from conductive materials such as, but not limited to, copper, and are mounted on a non-conductive polymeric material. The ribbon connectors 60A terminate at positive lead 63B and negative lead 69B for charging and discharging the battery.

FIG. 7A depicts a three (3) layer system forming one wall 70 of an outer casing for a battery stack plate (not shown), consisting of an interior layer 77 forming an interior side of outer casing 70 facing the battery (not shown), a mid layer 74 containing channels cut into the plate providing channels for the movement of the electrolytes into and out of the various compartments 75, and an outer layer 71 comprising a solid plate forming the outer skin of the battery casing 70.

At FIG. 7B, the interior layer 77 is shown. Apertures 72 and 73 allow passage of the acid additive 44 to the supply manifold 76 and from the return manifold 78 (FIG. 7C), respectively, into the plate stack (not shown) of each compartment 75 The spring-loaded piston activation mechanism 41 of FIG. 4 would pump acid additive 44 into the channel grid in layer 74 through port 72A and retrieve excess electrolyte through port 73A.

The mid plate 74 is depicted at FIG. 7C. A supply manifold 76 and a return manifold 78 are formed in plate 74, each connecting, respectively, to opposite ends of reservoir 40 (FIG. 4) with the supply manifold 76 connecting to an upper end of reservoir 40 through aperture 72A, and return manifold 78 connecting to a lower end of reservoir 40, behind the activation piston, through aperture 73A. Supply manifold 76 conveys an acid additive 44 from the reservoir 40 to each of the compartments 75, while return manifold 78 conveys excess acid additive 44 and electrolyte to the reservoir 40.

In the case of the series connected battery, as illustrated in FIGS. 6A-6C, the voltage on the tabs 63B/69B would be nine times that of the voltage differential in each of the plate stacks, since in a series connection, the voltages are additive.

In the case of a series connected Bimodal Battery, cited above, where the nine compartments in FIGS. 6A-6C were connected in series, special precautions must be undertaken to isolate the electrolyte in each compartment from that of each of the other so that there is no current flow through a common electrolyte path causing "soft shorts" and the premature internal discharge of the battery. This is especially necessary during the period of storage or low current mode of operation prior to activation to the high current mode. This could be accomplished by providing a frangible blocking material (not shown) between layers 77 and 74 to prevent intra-compartment electrolyte paths that would lead to premature compartment discharge. The material would be frangible in the sense that an elevated pressure of electrolyte delivered through manifold 76, during activation, would be sufficient to tear or punch through the frangible material, and allow electrolyte additive to enter the compartments.

Figure 8A:
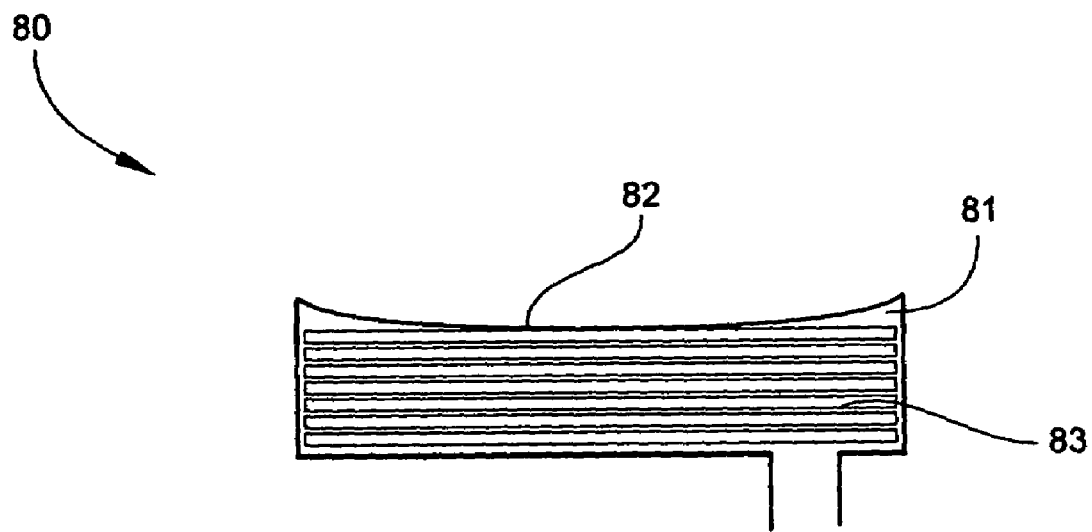
FIG. 8A is a side view of a single compartment of a bimodal battery with a "dimpled", concave top.
Figure 8B:
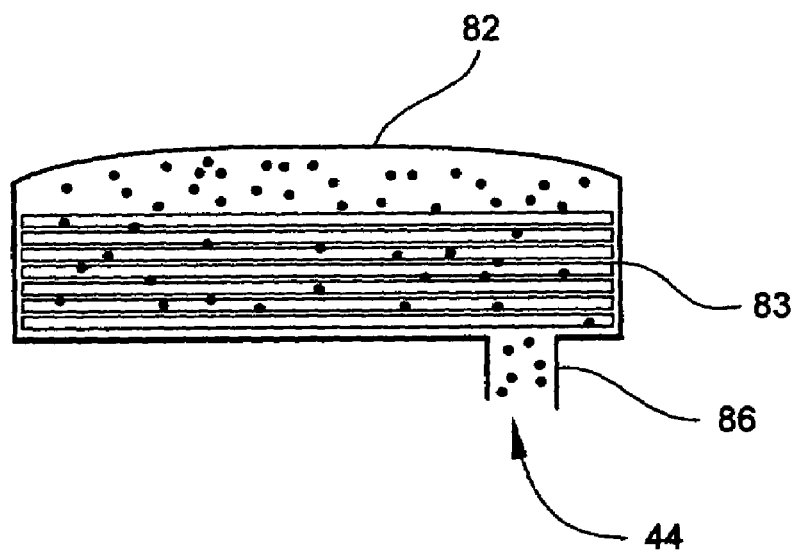
FIG. 8B is a side view of a single compartment with a convex top, after introduction of acid additive under pressure.

FIGS. 8A and 8B are side views of one compartment 80 containing a battery plate stack 83 which presents a means of handling excess electrolytes in each compartment 80 of a multi-compartment battery. The top surface 82 of each compartment 80 is formed with a concave shape, such that prior to activation, when the compartment 80 has only neutral electrolyte 81 or has a lower volume of electrolytes 81, the upper surface 82 is dimpled. As acid additive 44 is introduced into the plate stack 83 of each compartment 80 via port 86, the pressure created causes the upper surface 82 to pop outwardly to a planar (not shown) or convex shape. This capacity to expand the interior volume of the compartments 80 would eliminate the need for the return manifold 78 (FIG. 7C).

FIG. 9A is a side view of a one-way pressure sensitive ball valve 90 between the central well 23 and a compartment 25 before and after activation. The ball 92 is held against the valve seat 94 by means of a spring 96. Upon activation, as shown in FIG. 9B, pressure differential between the acid additive 44 in the central well 23 and compartment 25 exerts a positive pressure on the ball 92 via orifice 98 causing the ball to retract, allowing acid additive to flow into the compartment 25 via orifice 98 until the pressure is equilibrated. After the pressure has equilibrated post activation, the ball returns to the valve seat, blocking the flow of electrolyte from compartment to compartment via the central well. This inhibits parasitic currents from further discharging the battery.

FIG. 10A is a side view of a one-way valve 100 wherein a moveable flapper 102, held against a valve seat 104 by means of a spring 106, is caused to open after activation (see FIG. 10B), by the differential pressure between the central well 23 and the compartment 25, rotating the flapper and allowing the acid additive to flow through orifice 108 into compartment 25 until the pressure is equilibrated. After the pressure has equilibrated post activation, the flapper 102 returns to the valve seat 104, blocking the flow of electrolyte from compartment to compartment via the central well. This inhibits parasitic currents from further discharging the battery.

FIG. 11A is a side view of a pressure sensitive frangible membrane 112 with a pin-hole orifice 114 between the central well 23 and compartment 25 before activation. Before activation, the frangible membrane 112 blocks the acid additive from entering compartment 25 through pin-hole orifice 114. Upon activation, as shown in FIG. 11B, the differential pressure between the acid additive in 23 and compartment 25 causes the membrane 112 to fracture, allowing acid additive to flow into compartment 25 via the pin-hole 114 until the pressure is equilibrated. After activation, the flow of electrolyte from compartment to compartment is restricted by the size of the pin hole 114, thereby reducing the effects of the parasitic currents, although not totally eliminating the effect as is done by the ball and flapper valves described above.

Figure 12:
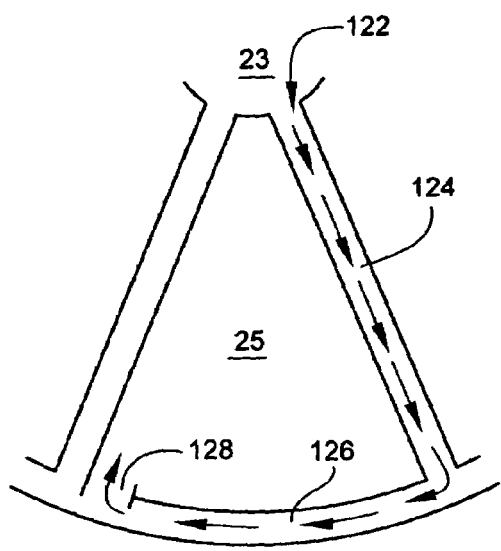
FIG. 12 is a top view of a means of lengthening the electrolyte flow path from central well to the individual compartments through fluid channel in the spokes and rim of the internal battery structure.

FIG. 12 is a top view of an alternate means of reducing the effects of the parasitic currents after activation by lengthening the electrolyte flow path from central well to the individual compartments thus retarding the movement of electrolyte from compartment to compartment. After activation, the acid additive under pressure flows form the central well 23 through orifice 122 and along a passage in the spoke 124, through a passage in the rim 126, into cell stack compartment 25 through orifice 128.

Figure 13:
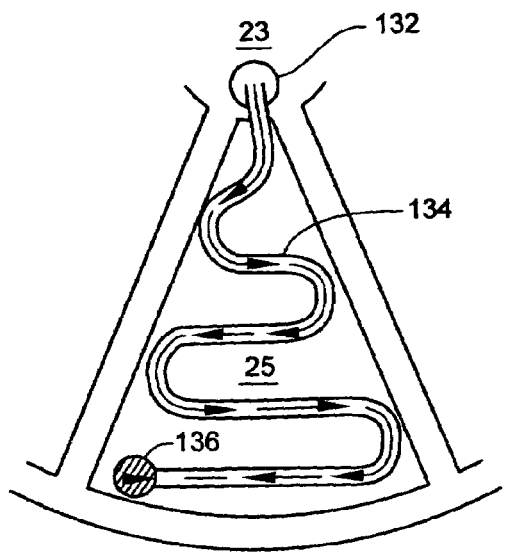
FIG. 13 is a top view of an alternate means of lengthening the flow path through channels in the layered multifunctional plate structure.

FIG. 13 is a top view of a means of lengthening the flow path using the three (3) layer outer casing composite structure illustrated in FIGS. 7A, 7B, and 7C, but with a serpentine channel built into the composite structure using the "platelet" technology described previously. In FIG. 13, the acid additive, under pressure, enters the serpentine channel 134 in the multifunctional plate through orifice 132 in the central well 23 and exits into the compartment 25 through orifice 136. This lengthening of the electrolyte path from the central well 23 to compartment 25 retards the parasitic currents after activation.

Figure 14:
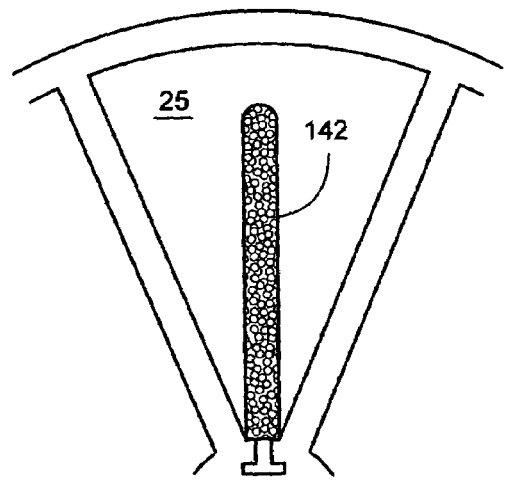
FIG. 14 is a top view of a compartment with a rectangular shaped frangible capsule or ampoule containing acid additive.

As mentioned above, an alternate means of eliminating the parasitic currents is to hold the acid additive, not in the central well, but in frangible ampoules, contained adjacent to the plate stack in the compartments, enclosed with the plate stack in a sealed foil pouch. FIG. 14 is a top view of a compartment with a rectangular shaped, frangible ampoule 142 containing acid additive.

Figure 15:
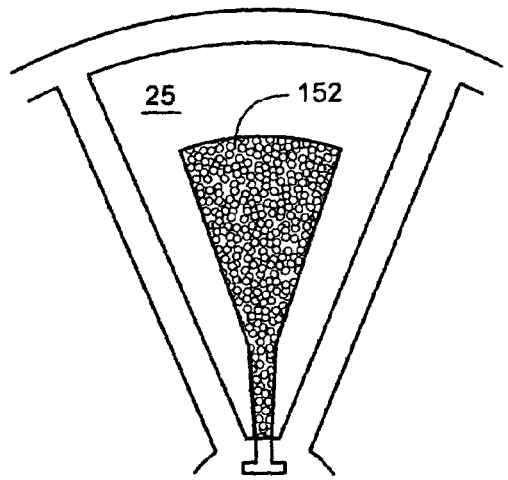
FIG. 15 is a top view of a frangible ampoule that conforms more closely to the shape of the compartment.

FIG. 15 is a top view of a frangible ampoule 152 that conforms more closely to the shape of the compartment and distributes acid additive more evenly to the plate stack.

Figure 16A:
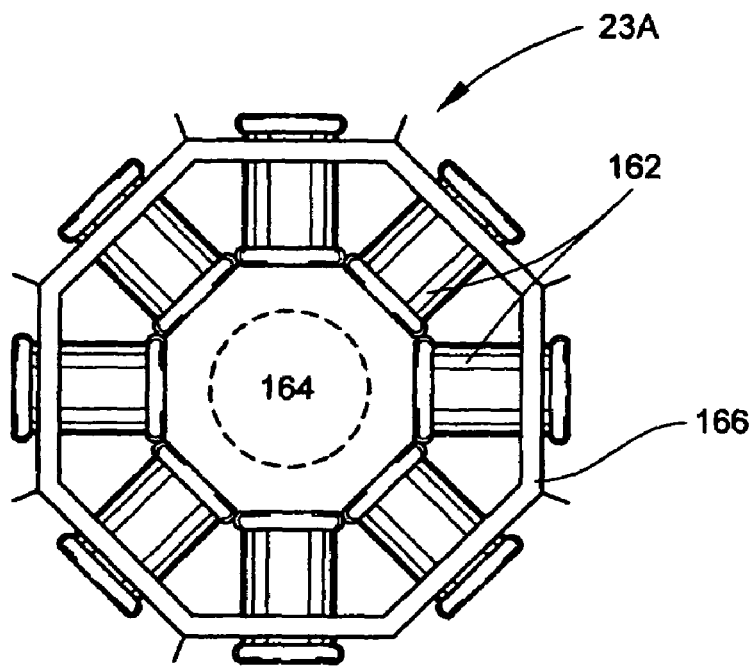
FIG. 16A is the top view of an alternate central well structure containing pyrotechnic-driven tampers to mechanically shock and fracture the glass ampoules.

FIG. 16A is the top view of an alternate central well structure 23A containing pyrotechnic-driven tampers 162 surrounding a pyrotechnic charge 164, held within a structure 166 that allows the tampers to move outward on the ignition of the pyrotechnic. Not shown are top and bottom plates that form a high pressure vessel with the side structure 166.

Figure 16B:
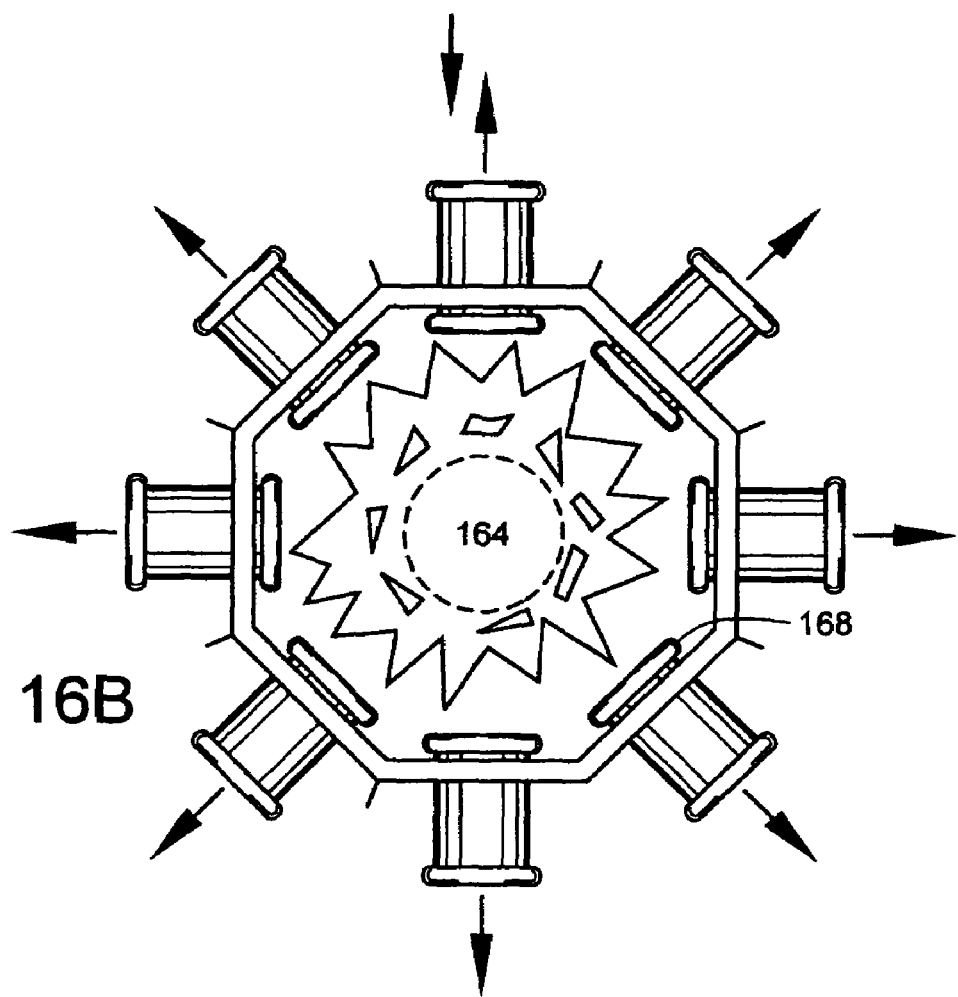
FIG. 16B is the top view of the alternate central well structure, after detonation of the pyrotechnic device, driving tampers into the compartments.

FIG. 16B shows the post initiation movement of the tampers into the compartments 25. Once the tampers are deployed, a lip and seal 168 on the tamper body 162 seals the internal pressure vessel so that high temperature gas from the detonation of the pyrotechnic 164, does not reach the compartments 25.

Figure 17A:
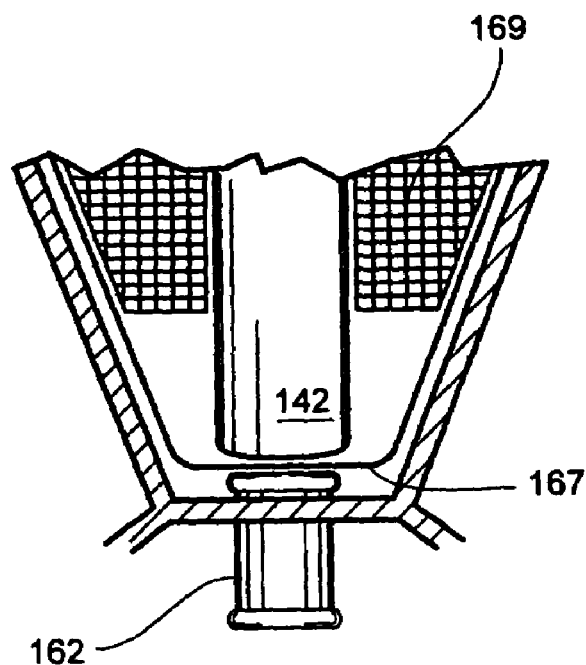
FIG. 17A is an enlarged view of the interface between the tamper and the glass ampoule in the wedge-shaped compartment enclosed in a metal foil envelope.

FIG. 17A is an enlarged view of the interface between the tamper 162 and the ampoule 142 contained within a foil envelope 167 that also contains the wedge-shaped plate stack 169.

Figure 17B:
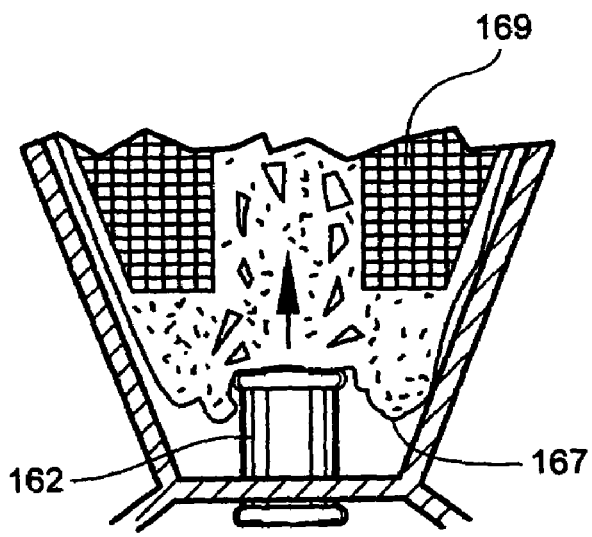
FIG. 17B is the enlarged view of the interface, after detonation, with the tamper crumpling the foil enclosure and fracturing the glass ampoule.

FIG. 17B is the enlarged view of the interface after detonation with the tamper 162 crumpling the foil enclosure 167 and fracturing the glass ampoule, distributing the acid additive into the plate stack 169.

It is to be understood that the present invention is not limited to the embodiments described above, but encompasses any and all embodiments within the scope of the following claims.

What is claimed is:

1. A conformable battery, capable of being manufactured to a desired shape, comprising:
    an outer casing having at least an upper and a lower face plate and at least one perimetric wall;
    at least two compartments, each of said at least two compartments isolated from each of the other of said at least two compartments by a grid of walls extending from said upper face plate to said lower face plate and connecting to said at least one perimetric wall, thereby dividing an internal volume of said battery into said at least two compartments and increasing the battery's structural stiffness and ability to sustain increased internal pressure;
    each of said at least two compartments containing therein an electrochemically active plate stack comprising positive and negative electrodes and separators immersed in electrolyte;
    a network of electrical conductors providing electrical connection between said plate stacks in each of said at least two compartments; and
    a reservoir containing an additive, wherein each of said at least two compartments are in fluidic communication with said reservoir such that said additive can flow from said reservoir to each of said at least two compartments, and expelling structure for enabling said additive within said reservoir, upon activation of said expelling structure, to be forcibly expelled from said reservoir and into each of said at least two compartments.

2. A battery, as defined in claim 1, wherein said battery has a desired shape, said desired shape being one of the shapes of the group consisting of:
    a substantially polygonal shape wherein said grid of walls lies between and substantially normal to two substantially polygonal upper and lower face plates;
    a substantially circular shape wherein said grid of walls lies between and substantially normal to two substantially circular upper and lower face plates; and
    a curved shape wherein said grid of walls lies between and substantially normal to two curved, non-planar upper and lower face plates.

3. A battery, as defined in claim 2, wherein each of said at least two compartments is substantially fluidically isolated from each of the other of said at least two compartments, said at least two compartments being connected together by means of said network of electrical conductors.

4. A battery, as defined in claim 1, wherein said plate stack in said compartments are electrically connected in series.

5. A battery, as defined in claim 1, wherein said additive contained within said reservoir is an acid additive; and
    wherein said battery is a bimodal battery, wherein prior to activation, said battery operates in a low power mode, and upon activation of the battery said battery goes into a high power mode, said acid additive being forcibly expelled from said reservoir and flowing into each of said at least two compartments, with power generated by the battery operating in the high power mode being greater than the power generated by the battery in the low power mode.

6. A battery, as defined in claim 5, wherein, prior to activation of said battery and release of said acid additive from said reservoir, said electrolyte in which said plate stacks are immersed is a neutral electrolyte.

7. A battery, as defined in claim 5, wherein at least one of said at least two compartments is in fluid communication with a return valve of said reservoir, whereby excess fluid in said at least one of said at least two compartments caused by the addition of said acid additive can be released from said at least one compartment and returned to said reservoir.

8. A battery, as defined in claim 5, wherein a top surface of at least one of said at least two compartments is manufactured with a concave shape prior, whereby when said battery is activated and said acid additive is released from said reservoir, the increased pressure caused by the addition of said acid additive causes said concave top surface to pop outwardly to a planar or convex shape to accommodate the increased volume of fluid within said compartment.

9. A battery, as defined in claim 3, wherein said substantial fluidic isolation of each of said at least two compartments is provided by structure that limits movement of said electrolyte from into and out of said compartment.

10. A battery, as defined in claim 9, wherein each of said at least two compartments has structure which prevents fluid from entering or exiting each respective compartment until overcome by sufficient pressure.

11. A battery, as defined in claim 10, wherein said structure comprises a pressure-sensitive frangible membrane which is fractured upon application of sufficient pressure by said acid additive upon activation of said battery.

12. A battery, as defined in claim 10, wherein, after said structure is overcome by sufficient pressure and there is pressure equalization, said structure serves once again to prevent fluid from entering or exiting each respective compartment.

13. A battery, as defined in claim 12, wherein said structure comprises a one-way valve.

14. A battery, as defined in claim 13, wherein said one-way valve is one of the group consisting of a ball valve and a flapper valve.

15. A battery, as defined in claim 5, further comprising means for inhibiting flow between said at least two compartments by lengthening the electrolyte flow path from the reservoir to the individual compartments as compared to the shortest path possible.

16. A battery, as defined in claim 15, wherein said means for inhibiting flow comprises one of the group consisting of a serpentine flow path between the reservoir and a point of entry of the flow path into a respective compartment, and a flow path that circumscribes a plurality of sides of a respective compartment and enters said compartment at a side remote from said reservoir.

17. A conformable battery capable of being manufactured to a desired shape, comprising:
  an outer casing having at least an upper and a lower face plate and at least one perimetric wall;
  at least two compartments, each of said at least two compartments isolated from each of the other of said at least two compartments by a grid of walls extending from said upper face plate to said lower face plate and connecting to said at least one perimetric wall, thereby dividing an internal volume of said battery into said at least two compartments and increasing the battery's structural stiffness and ability to sustain increased internal pressure;
  each of said at least two compartments containing therein an electrochemically active plate stack comprising positive and negative electrodes and separators immersed in electrolyte; and
  a network of electrical conductors providing electrical connection between said plate stacks in each of said at least two compartments,
  wherein each of said at least two compartments contains a frangible ampoule containing an additive, said battery further including means which, upon activation of the battery, causes the ampoule to rupture, thereby releasing said acid additive into the compartment in which it is located.

18. A battery, as defined in claim 17, wherein said means which causes said ampoule to rupture is a pyrotechnic charge in a central well of said battery, and a plurality of tampers, each of which extends between said central well and a respective one of said at least two compartments,
  whereby activation of said battery causes said pyrotechnic charge to detonate, thereby forcing said tampers to move from a first position where they extend predominantly within said central well to a second position where they extend predominantly within said respective compartments, said movement causing said ampoules to rupture and release the additive contained therein.

19. A battery, as defined in claim 5, wherein one of said upper and lower face plates comprises a plurality of stacked layers, with channels and vias cut into said layers, which layers are stacked in a superimposed relationship and joined together such that closed channels are formed within the body of said one of said upper and lower face plates, thereby allowing fluid to circulate within said one of said upper and lower face plates and be delivered to each of said at least two compartments.

* * * * *